United States Patent
Aoyama

[11] Patent Number: 5,248,058
[45] Date of Patent: Sep. 28, 1993

[54] PARTS FEEDER

[76] Inventor: Yoshitaka Aoyama, 20-11, Makitsukadai 2-cho, Sakai-shi, Osaka 590-01, Japan

[21] Appl. No.: 819,499

[22] Filed: Jan. 10, 1992

[30] Foreign Application Priority Data

Jan. 12, 1991 [JP] Japan .................................. 3-69556
Jul. 20, 1991 [JP] Japan ................................. 3-271715

[51] Int. Cl.⁵ ............................................. B65H 9/08
[52] U.S. Cl. .................................. 221/165; 221/212; 221/238
[58] Field of Search ............... 221/212, 156, 161, 165, 221/224, 238, 311

[56] References Cited

U.S. PATENT DOCUMENTS

| | | |
|---|---|---|
| 2,385,521 | 9/1945 | Mead ............................. 221/238 X |
| 3,054,170 | 9/1962 | Benichasa et al. .................. 221/212 |
| 3,114,477 | 12/1963 | Dixon .................................. 221/238 |
| 3,261,481 | 7/1966 | Laverty . |
| 4,511,058 | 4/1985 | Carminati ....................... 221/212 X |
| 4,815,343 | 3/1989 | Sofinowski . |
| 4,943,098 | 7/1990 | Aoyama . |
| 5,044,519 | 9/1991 | Aoyama ............................. 221/212 |

FOREIGN PATENT DOCUMENTS 535704 10/1931 Fed. Rep. of Germany .
3934900 6/1989 Fed. Rep. of Germany .

OTHER PUBLICATIONS

Patent Abstracts of Japan, vol. 10, No. 311 (M-528) (2367) Oct. 23, 1986 & JP-A-61 121 839, Jun. 9, 1986.

Primary Examiner—Robert P. Olszewski
Assistant Examiner—Dean A. Reichard
Attorney, Agent, or Firm—Pollock, VandeSande & Priddy

[57] ABSTRACT

In order to feed parts at high reliability without malfunction, by accurately positioning the parts on the axial line of a feed rod, when feeding parts by means of a retractable feed rod, a feed member making retractable, circular and parallel motions is disposed at the end portion of a parts feed pipe, and the feed member is provided with an element for holding the parts at a specific position, while the feed rod is provided with a device for holding the parts.

2 Claims, 5 Drawing Sheets

PARTS FEEDER

BACKGROUND OF THE INVENTION

1. Field of the Invention

The present invention relates to a parts feeder, and more particularly to a type for bringing parts to a desired position by means of a retractable parts feed rod.

2. Prior Art

In the prior art, a retractable feed rod is used, and parts holding means comprising a hole and a chuck mechanism is attached to the front end of the rod, a mechanism for temporarily stopping the parts, such as bolts, moved from a parts feeder or the like is disposed on the axial line of the feed rod, the feed rod is advanced toward the thus stopped parts, and the parts are held by holding means and brought to the desired position.

In such prior art apparatus, both accurate positioning of parts on the axial line of the feed rod and temporary stopping of parts securely in a firm state must be realized by a single mechanism on the axial line of the feed rod, the mechanism itself must be presented at a high precision, and if the precision is lowered even slightly, then the holding means of the feed rod and the parts are not engaged correctly, and the parts may drop off or other problems are caused. Moreover, to temporarily stop the parts on the axial line of the feed rod, the space for installation of the temporary stopping mechanism is either extremely restricted, or this mechanism must be positioned far ahead of the front end of the feed rod, so that the entire equipment becomes very long.

SUMMARY OF THE INVENTION

The invention is presented to solve the above problems, and is characterized by disposing the end portion of a parts feed pipe near the axial line of a retractable feed rod, disposing a retractable parts feed member at this end portion, attaching means for holding parts at a specific position of the feed member, and attaching means for holding the parts positioned by the advanced feed member to the feed rod, in which the feed member holds the parts firmly at the end portion of the parts feed pipe. As the feed member later advances, the parts are stopped when on the axis, i.e., the axial line of the feed rod, to which the feed rod is advanced to hold the parts. At nearly the same time the feed member retreats, and the feed rod advances further to bring the parts to the desired position.

In one aspect of the invention a magnet used as the means for holding the parts at a specific position which is intended to attract the parts accurately at the specified position of the feed member at the end portion of the parts feed pipe. In another aspect of the invention a magnet is used as the means for holding the parts of the feed rod by the attraction force of the magnet. In still another feature of the invention is attached to the equipment so that the parts feed pipe and feed member move back and forth together along the axial line of the feed rod, in which embodiment the parts are brought closer to the waiting feed rod to achieve holding of parts.

The invention is in one embodiment characterized by disposing a feed member for transferring parts onto a retractable axial line of a retractable feed rod, attaching means for holding parts at a predetermined position at the feed member, providing the feed rod with means for holding the positioned parts on the retractable axial line, and moving the feed member by a circular motion, a lateral motion whereby the feed member remains parallel to and spaced from an initial position, or a combination of linear motion and circular motion or linear motion and lateral movement In this embodiment, the feed member firmly holds the parts at the end portion of the parts feed pipe. The parts are stopped still on the axial line of the feed rod by various embodiment for advancing the feed member, and the feed rod is extended to hold the parts. At about the same time the feed member retreats and in succession, the feed rod is further advanced to bring the parts to the desired position.

The invention in another embodiment employs a magnet as the means for holding the parts at a specific position for attracting the parts accurately at the specified position of the feed member at the end portion of the parts feed pipe. The invention further may employ a a magnet as the means for holding the parts of the feed rod attraction force of the magnet. The invention further may include means for moving the feed member may move back and forth along the retractable axial line of the feed rod, while the feed member makes a circular motion, in which the parts are brought closer to the waiting feed rod to hold the parts. The invention may also provide means for the feed member to make a parallel movement.

DESCRIPTION OF THE PREFERRED EMBODIMENTS

Figure 1:
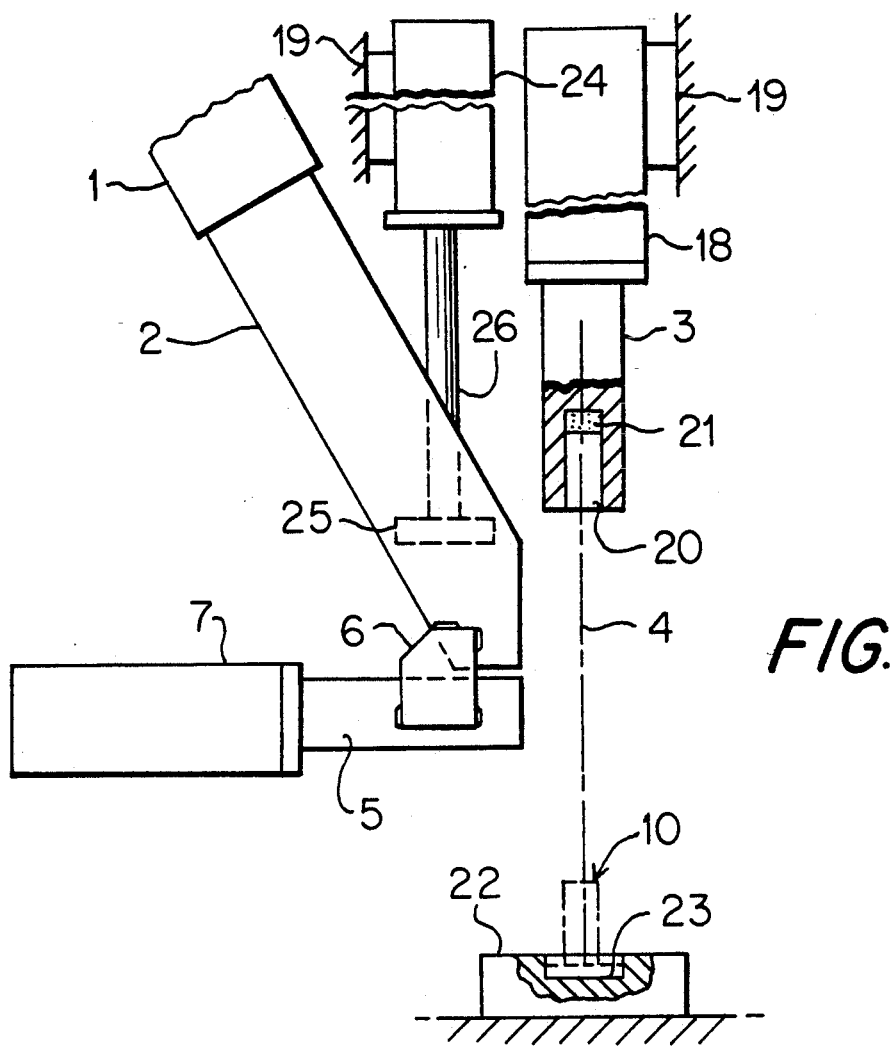
FIG. 1 is a side view of the appearance of the entire equipment showing an embodiment of the invention.

First, referring to an embodiment illustrated in FIG. 1 through FIG. 4, a flexible parts feed hose 1 extended from a parts feeder (not shown) is connected to a parts feed pipe 2. A feed rod 3 moves back and forth, or an axial line 4, and the parts feed pipe 2 is disposed obliquely at an acute angle to and near the axial line 4. To the parts feed pipe 2, a guide member 5 of a pipe section opened upward is firmly fixed through a bracket 6, and an air cylinder 7 is firmly coupled with the guide member 5. In the guide member 5, a feed member 8 is tightly inserted in a retractable manner, and a piston rod 9 of the air cylinder 7 is coupled to feed member 8. A part 10 shown in the drawing is a flanged bolt, consisting of a shaft 11 and a circular flange 12. Feed member 8 is provided with a recess 14, having an arc part 13 for engaging flange 12 in its upper part. The right side is open as shown in the drawing.

The feed member 8 is provided with means for holding the part 10 at a specific position, and as its practical method, various mechanisms may be considered such as a spring mechanism and a chuck mechanism. In this embodiment a magnet (permanent magnet) 15 is used. A hole is drilled in the feed member 8, the magnet 15 is inserted deep inside, and then a plug 16 is pressed in. The parts feed pipe 2 has a slot 17 opened to the axial line 4 side of the feed rod, along which the shaft part 11 is designed to pass.

The feed rod 3 is coupled to a piston rod (not shown) of an air cylinder 18, which is firmly fixed to a stopping member 19. The feed rod 3 has a receiving hole 20 for accepting the shaft part 11, and also comprises means for holding parts. This means may be realized in various forms such as a leaf spring, and a magnet (permanent magnet) 21 is used in this embodiment. The magnet 21 is inserted deep inside of the receiving hole 20. The part 10 held by the feed rod 3 is pressed into a recess 23 in an opposite part 22 fixed on the axial line.

Another air cylinder 24 is fixed to the stopping member 19, and a piston rod 26 of the air cylinder is coupled to a bracket 25 welded to the parts feed pipe 2. The installation position of the air cylinder 24 is so set that the parts feed pipe 2 and feed member 8 may be moved back and forth together parallel to the axial line 4 of the feed rod.

To make the attraction force of the magnets 15 and 21 more effective, the parts feed pipe 2, feed member 8, guide member 5, feed rod 3 and other parts should be made of nonmagnetic material such as stainless steel. Although the feed rod 3 is shown to move back and forth in the vertical direction, the rod may be designed to move in an oblique or a horizontal stroke by varying the mounting position of the entire equipment in FIG. 1.

Figure 2:
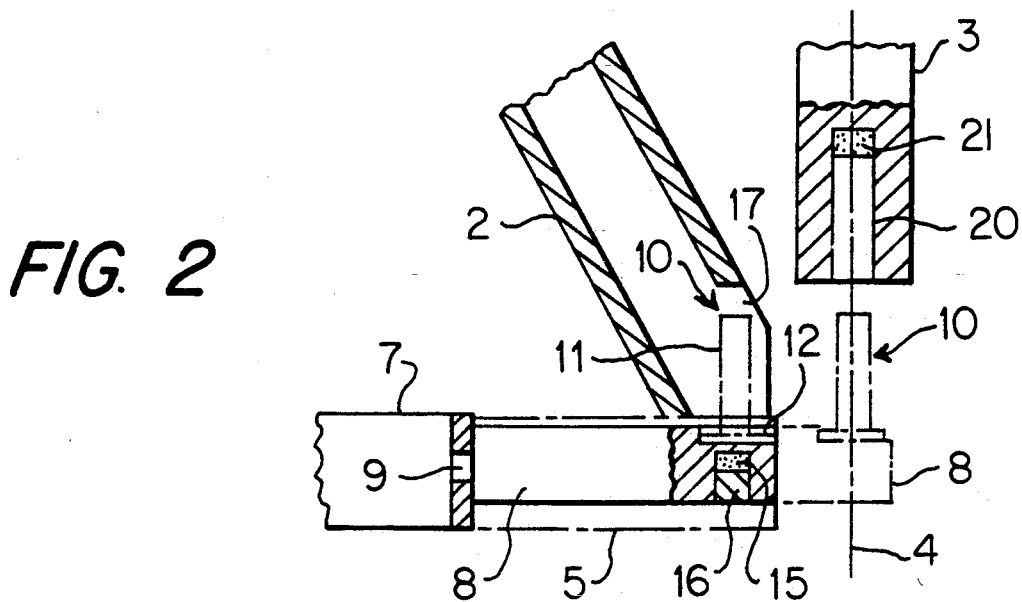
FIG. 2 is a longitudinal sectional view magnifying the essential parts of the equipment in FIG. 1.
Figure 3:
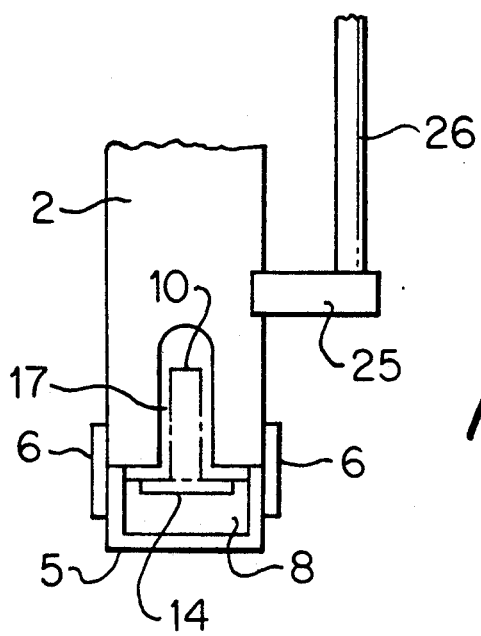
FIG. 3 is a front view of the end portion of a parts feed pipe.

The operation of the above embodiment is explained below. When the part 10 is sent from the parts feed pipe 2 in the state as shown in FIG. 2, the flange 12 gets into the recess 14 of the waiting feed member 8, and is attracted by the magnet 15. At this time, since the flange 12 fits tightly within the recess 14, the relative position of the feed member 8 with part 10 is accurately determined. In succession, the feed member 8 advances by the function of the air cylinder 7, and is stopped at the position where the part 10 coincides with the axial line 4 (the position indicated by double dot chain line in FIG. 2), and successively, by the action of the air cylinder 24, the feed member 8 and parts feed, pipe 2 are pulled up together when the shaft part 11 enters receiving hole 20 and is attracted by magnet 21. In this state, as the feed member 8 is moved back and forth by the air cylinder 7, the flange 12 slides on the surface of the recess 14 and the part 10 is held in the receiving hole 20. As the feed rod 3 descends directly in this state, part 10 is pressed into the recess 23 of the opposite part 22 as shown in FIG. 1.

In this embodiment, the part 10 on the axial line 4 is shown ready to insert it into the receiving hole 20, but otherwise the air cylinder 24 may be stopped to fix the parts feed pipe 2 and guide member 5 at the stopping member 19, and the feed member 8 may be moved back in the descending stroke of the shaft part 11 after somewhat advancing into the receiving hole 20 by the descending motion of the feed rod 3. The feed rod 3 may be advanced in a two-step motion, and forwarding of the feed rod 3 may be stopped when the shaft part 11 fully enters the receiving hole 20, and the feed member 8 may be withdrawn, and then the feed rod 3 may be advanced again.

Figure 5:
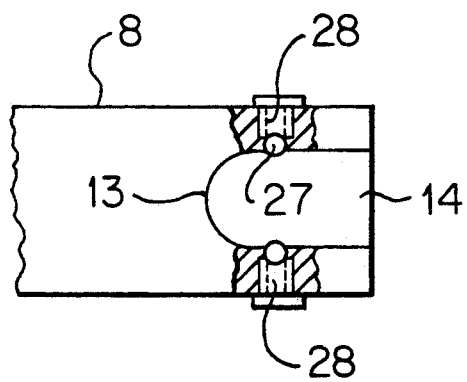
FIG. 5 is a plan view showing an example of another feed member.
Figure 6:
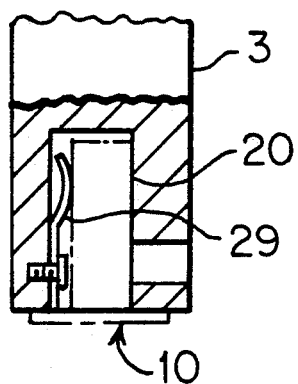
FIG. 6 is a longitudinal sectional view showing an example of another feed rod.
Figure 7:
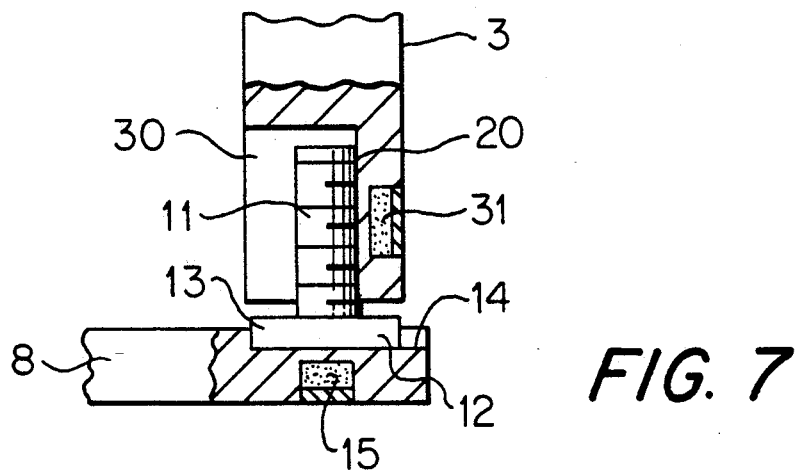
FIG. 7 is a longitudinal sectional view showing an example of another feed rod.

FIG. 5 shows a modified example of the means for holding the parts at a specific position disposed in the feed member, in which a ball 27 is exposed to the recess 14, and an elastic force is provided by a coil spring 28. Therefore, since the flange 12 receives the elastic force of the ball 27 on its outer circumference, it is positioned in tight contact with the arc part 13. FIG. 6 shows a modified example of the means for holding the parts of the feed rod, in which a leaf spring 29 is fixed in the receiving hole 20, thereby holding the shaft part 11. FIG. 7 shows an open part 30 disposed at the left side of the receiving hole 20, and a magnet (permanent magnet) 31 attached to the lateral side of the feed rod 3, in which the part 10 on the feed member 8 passes through the open part 30, and gets into the receiving hole 20 to be held by the magnet 31. In this case, the attraction force of the magnet 31 must be set stronger than that of the magnet 15.

Figure 8:
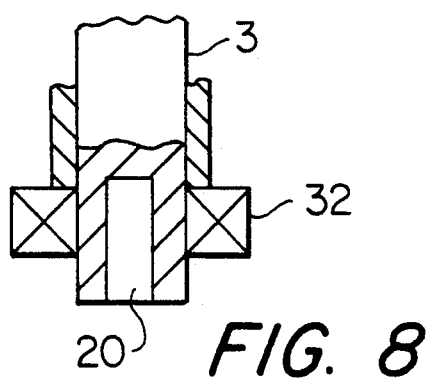
FIG. 8 is a longitudinal sectional view showing an example of a different feed rod.
Figure 9:
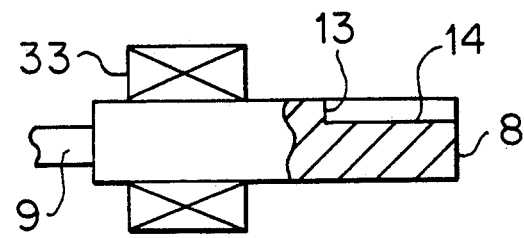
FIG. 9 is a longitudinal sectional view showing an example of another feed member.
Figure 10:
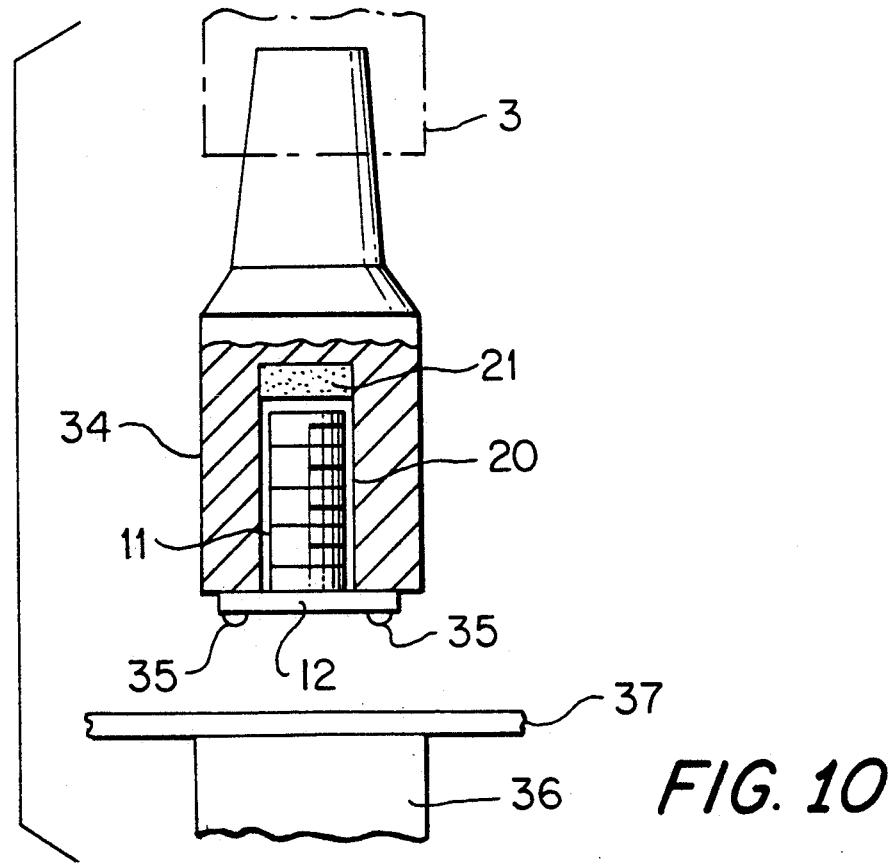
FIG. 10 is a longitudinal sectional view in which the feed rod is an electrode.

FIG. 8 and FIG. 9 disclose electromagnets used instead of the permanent magnets 21, 15, in which the feed rod 3 and feed member 8 are made of iron which is a magnetic material, and they penetrate through excitation coils 32, 33. In Fig. 10, the feed rod itself is an electrode of a projection welding machine, in which a movable electrode 34 is connected to the feed rod 3, and the receiving hole 20 and magnet 21 are similarly disposed. A projection 35 for fusion is disposed on the flange 12 of the part 10, and a steel plate part 36 is mounted on a fixed electrode 37.

According to this embodiment, the parts are held at a specific position on the feed member at a position remote from the axial line of the feed rod 3, and in this state the parts are transferred onto the axial line of the feed rod; thus the relative position of the parts and feed rod is always kept correctly, and a feeding action of high reliability is obtained. In such an operating sequence, accordingly, the mechanism employed herein is simple and high in precision, and the space can be effectively utilized at the same time.

In addition, since the feed member 8 is positioned at the end portion of the parts feed pipe, moving and positioning of parts may be achieved very smoothly.

Figure 4:
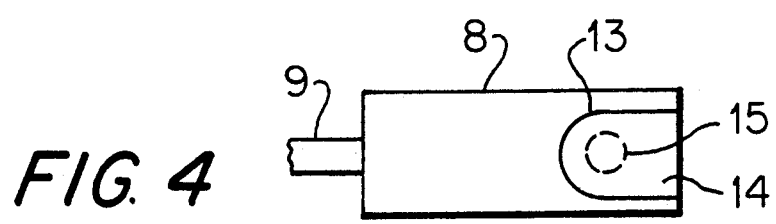
FIG. 4 is a plan view of a feed member.
Figure 11:
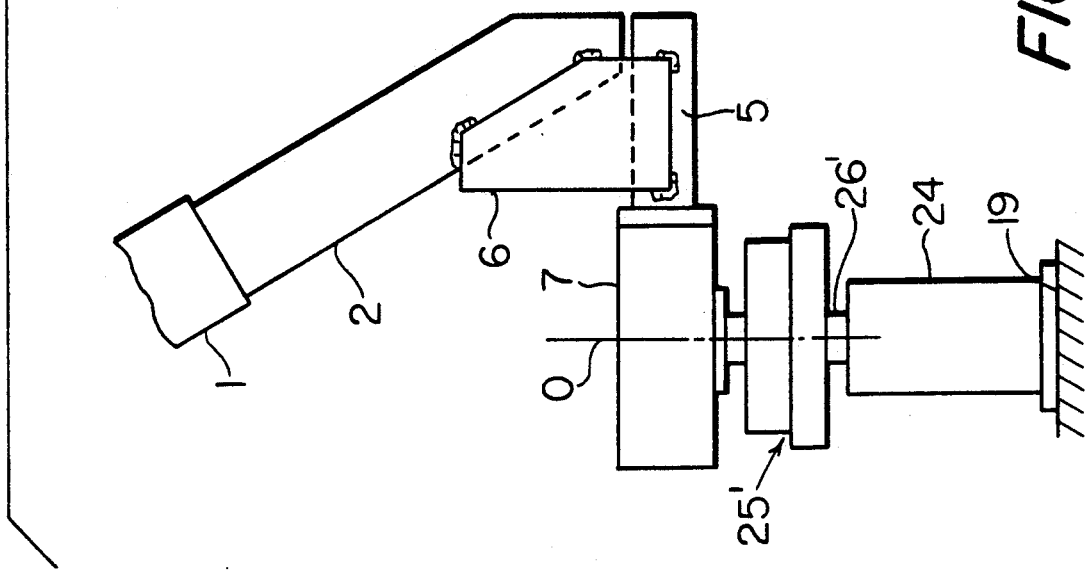
FIG. 11 is a side view of a different embodiment of the invention.
Figure 12:
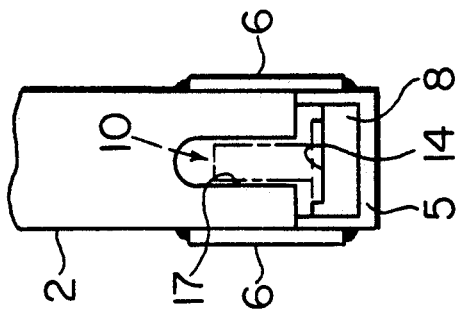
FIG. 12 is a front view of the end portion of a parts feed pipe.
Figure 13:
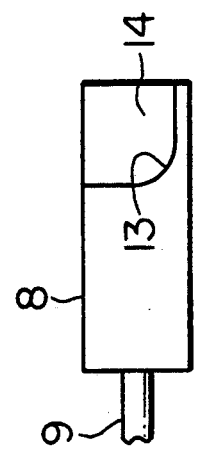
FIG. 13 is a plan view of a feed member.

Referring to the embodiment disclosed in FIG. 11 through FIG. 13, a flexible parts feed hose 1 extended from a parts feeder (not shown) is connected to a parts feed pipe 2. A feed rod 3 is to move back and forth, on a retractable axial line (hereinafter called merely axial line) 4, and the parts feed pipe 2 is disposed obliquely at an acute angle to the axial line 4. To the parts feed pipe 2, a guide member 5 of a pipe section open upward is fixed through a bracket 6, and an air cylinder 7 is firmly coupled to the guide member 5. In the guide member 5, a feed member 8 is tightly inserted in a retractable manner, and a piston rod 9 of the air cylinder 7 is coupled thereto. A part 10 shown in the drawing is a bolt with a flange, consisting of a shaft part 11 and a circular flange 12, and on the top of the feed member 8 there is a recess 14 having an arc part 13 to be matched with the flange 12, and the right side and upper side are open as shown in FIG. 4.

The feed member 8 is provided with means for holding the part 10 at a specific position, and in a practical embodiment, various mechanisms may be considered, such as a spring mechanism and a chuck mechanism, and in this embodiment a magnet (permanent magnet) 15 is used. A hole is drilled in the feed member 8, and the magnet 15 is inserted deep inside, and then a plug 16 is pressed in. The parts feed pipe 2 has a slot 17 opened to the axial line 4 side of the feed rod 3, in which the shaft part 11 is designed to pass.

The feed rod 3 is coupled, to a piston rod (not shown) of an air cylinder 18, which is firmly fixed to a stopping member 19. The feed rod 3 has a receiving hole 20 for accepting the shaft part 11, and also comprises means for holding parts. This means may be realized in various forms such as leaf spring, and a magnet (permanent magnet) 21 is used in this embodiment. The magnet 21 is inserted deep inside of the receiving hole 20. The part 10 held by the feed rod 3 is pressed into a recess 23 in the opposite part 22 fixed on axial line 4.

Another air cylinder 24 is fixed to the stopping member 19, a rotary motor 25' is fixed to its piston rod 26', and an air cylinder 7 is coupled to its output shaft. The installation position of the air cylinder 24 is so set that the parts feed pipe 2 and feed member 8 may move back and forth together across axial line 4 of the feed rod. At the same time, by the motion of the rotary motor 25', at least the feed member 8 is designed to rotate about the axial line 0 of the rotary motor 25'. What is expressed at least here is that only the parts feed pipe 2 may be fixed to the stopping member by eliminating the bracket 6. As the rotary motor, an ordinary type operated by air or oil pressure having a vane and rotor inserted in a cylindrical case may be used.

To make the attraction force of the magnets 15 and 21 more effective, the parts feed pipe 2, feed member 8, guide member 5, feed rod 3 and other parts should be made of nonmagnetic material such as stainless steel. Although the feed rod 3 is shown to move back and forth in the ,vertical direction, rod 3 may be designed to move in an oblique or a horizontal stroke by varying the mounting position of the entire equipment in FIG. 11.

The operation of the above embodiment is described below. In the state in FIG. 2, when the part 10 is sent from the parts feed pipe 2, the flange 12 fits into the recess 14 of the waiting feed member 8, and is attracted by the magnet 15. At this time, since the flange 12 is tightly matched with the recess 14, the relative position of the feed member 8 and the part 10 is correctly determined. Next, the feed member 8 is advanced by the function of the air cylinder 7, and the part 10 is stopped at the matching position with the axial line 4 (the position indicated by double dot chain line in FIG. 12). In succession when the feed member 8 and part feed pipe 2 are lifted together by the action of the air cylinder 24, the shaft part 11 is introduced into the receiving hole 20, and is attracted by magnet 21. In this state, when the feed member 8 is put in circular motion by the torque of the rotary motor 25', the flange 12 slides on the surface of the recess 14, while the part 10 is held in the receiving hole 20, and as the feed rod 3 descends directly in this state. Part 10 is pressed into the recess 23 of the opposite part as shown in FIG. 11. This operation pattern corresponds to the case of FIG. 15.

In this embodiment, the part 10 on the axial line 4 is shown to get into the receiving hole 20, but otherwise the air cylinder 24 may be stopped to fix the parts feed pipe 2 and guide member 5 at the stopping member 19. The feed member 8 may be moved back in the descending stroke of the shaft part 11 after somewhat advancing into the receiving hole 20 by the descending motion of the feed rod 3, or the feed rod 3 may be advanced in a two-step motion. Forward of the feed rod 3 may be stopped when the shaft part 11 fully gets into the receiving hole 20, and the feed member 8 may be withdrawn, and then the feed rod 3 may be advanced again.

Figure 14:
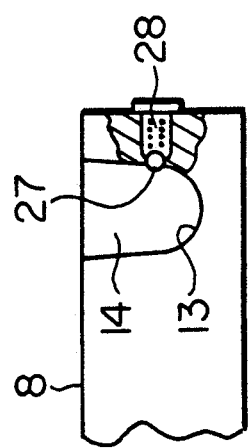
FIG. 14 is a plan view showing an example of another feed member.

FIG. 14 shows a modified example of the means for holding the parts at a specific position disposed in the feed member, in which a ball 27 is exposed to the recess 14, and an elastic force is provided by a coil spring 28. Therefore, since the flange 12 receives the elastic force of the ball 27 on its outer circumference, it is positioned in tight contact with the arc part 13.

Figure 17:
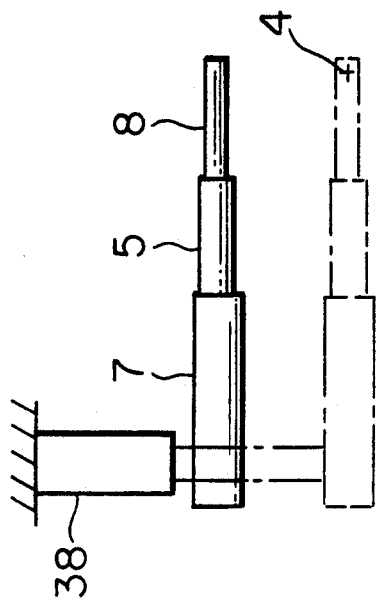
FIG. 17 is a plan view showing a different movement pattern of a feed member.
Figure 18:
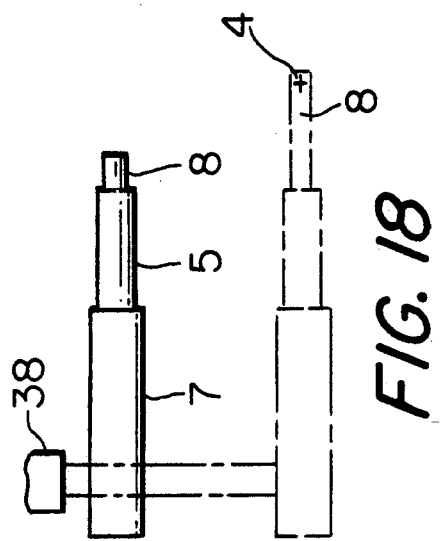
FIG. 18 is a plan view showing a further different movement pattern of a feed member.
Figure 15:
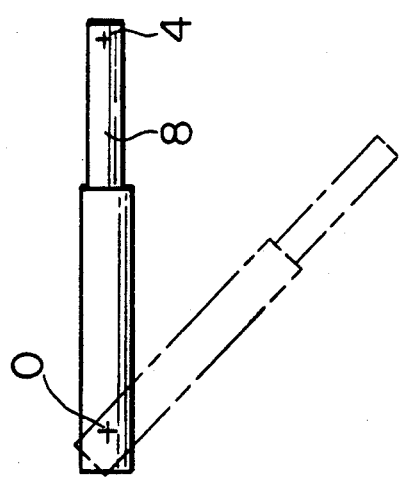
FIG. 15 is a plan view showing a movement pattern of a feed member.
Figure 16:
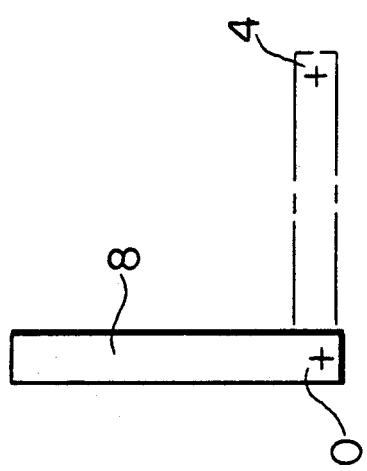
FIG. 16 is a plan view showing another movement pattern of a feed member.

FIG. 15 to FIG. 18 show several types of movements of the feed member 3. The movements of FIG. 15 is as described above. FIG. 16 is a type without expansion function provided in the feed member 8 itself, in which merely the arm rotates to position the parts on the axial line 4. FIG. 17 is a type of mere parallel movement without including circular motion, in which an air cylinder 38 for parallel movement is disposed in the air cylinder 7, and the parts are held at the position indicated by a solid line in the drawing, and are held toward the feed rod 3 at the position indicated by the double dot chain line. In FIG. 18, the parts are received in the contracted state of the feed member 8, and then, in the extended state as indicated by the double dot chain line (at this time circular motion may be also combined), the parts are positioned on the axial line 4. Aside from such movement patterns, by combining various motions such as extending and contracting motion, rotary motion and parallel motion, the operation suited to the peripheral related members may be achieved.

According to the embodiment, the parts are held at a specific predetermined position on the feed member at a position remote from the axial line of the feed rod, and in this state the parts are then transferred onto the axial line of the feed rod, so that the relative position of the parts and feed rod is always kept correctly, and feeding action of high reliability is achieved. In this operating sequence, therefore, the mechanism may be simple and high in precision as shown in the embodiment, and the space may be effectively utilized at the same time. Besides, since the feed member may work in various compound forms such as circular motion, parallel movement and extending and contracting motion, the equipment may be rationally disposed so as not to interfere with the peripheral members.

Furthermore, since the feed member is waiting at the end portion of the parts feed pipe, transfer and positioning of the parts may be achieved very smoothly.

I claim:
1. A parts feeder comprising:
   a parts feed pipe having a parts dispensing end positioned adjacent a parts feed member which reciprocates along a first axis;
   a housing for enclosing the feed member;

a feed rod for receiving a part delivered to it by the feed member, the feed rod reciprocating along a second axis perpendicular to the first axis;

separate means for releasably holding parts in the feed member and the feed rod;

means for moving the feed member housing and the feed pipe back and forth together, along a direction parallel to the second axis;

means for reciprocating the feed member along the first axis to position a part adjacent the feed rod; and means for reciprocating the feed rod along the second axis to pick up a part and translate it to another point.

2. The parts feeder set forth in claim 1 together with means connected to the feed member housing and the feed pipe for rotating them about a third axis, parallel to the second axis, and allowing sliding contact of a part relative to the feed rod during receipt of the part within the feed rod.

* * * * *